No. 832,179. PATENTED OCT. 2, 1906.
A. S. BEAN.
INSECT DESTROYING DEVICE.
APPLICATION FILED MAR. 7, 1906.

Witnesses:
Chas. F. Bassett
M. A. Milord

Inventor
A. S. Bean
By Frederick Benjamin
Atty.

UNITED STATES PATENT OFFICE.

ALONZO S. BEAN, OF NEW PLYMOUTH, IDAHO.

INSECT-DESTROYING DEVICE.

No. 832,179.     Specification of Letters Patent.     Patented Oct. 2, 1906.

Application filed March 7, 1906. Serial No. 304,644.

*To all whom it may concern:*

Be it known that I, ALONZO S. BEAN, a citizen of the United States, residing at New Plymouth, in the county of Canyon and State of Idaho, have invented certain new and useful Improvements in Insect-Destroying Devices, of which the following is a specification.

My invention relates to insect-destroying devices, and especially to that class in which the insects or larvæ are induced to enter a compartment and afterward destroyed.

The chief objects of my improvement are to provide a simple, inexpensive, and efficient implement which can be readily attached to fruit or other trees and be easily operated by an inexperienced person.

It is a matter of common observation that the larvæ of many insects injurious to fruit-trees are in the habit of seeking some suitable place in which to spin their cocoons upon the very tree the leaves of which they are accustomed to devour, and taking advantage of this fact, I attach to the tree-body a receptacle that will afford a hiding-place which the insect will instinctively seek and provide it with means for quickly destroying them when so entrapped.

Figure 1:
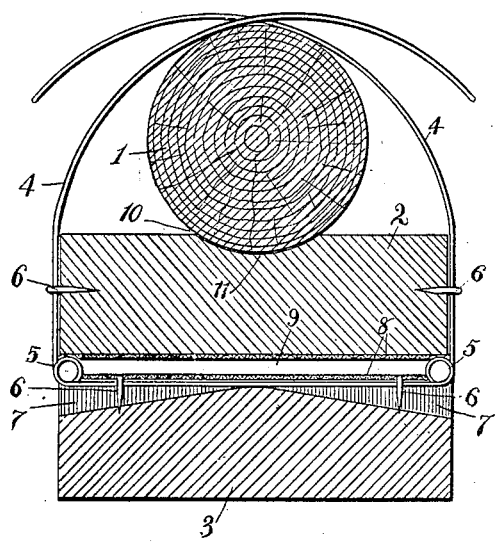
Figure 2:
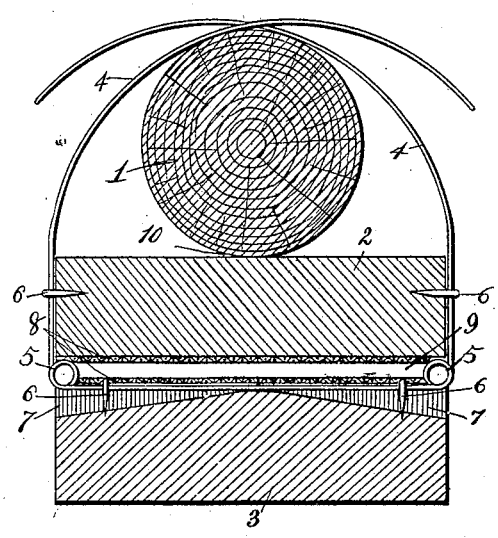
Figure 3:
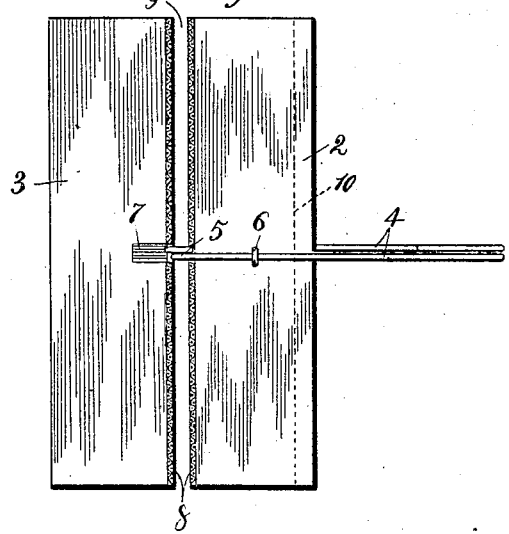

In the accompanying drawings, which form a part of this specification, Figure 1 is a cross-sectional view of my improved insect-destroyer, shown detachably secured to the trunk of a tree. Fig. 2 is a similar view showing a modification in the form of one of the blocks, and Fig. 3 is a side view in elevation of the device removed from the tree.

Referring to the drawings, 1 represents a tree-trunk, to which blocks 2 and 3 are removably attached by means of a spring-wire 4, which forms an adjustable clasp secured to said blocks by staples 6. The clasp is shown composed of a single wire, although it may be formed of two pieces. The ends of the wire 4 project considerably beyond the block 2 in order to accommodate tree-trunks of different diameters. Upon the wire 4 are formed two coils 5, preferably composed each of a single turn, which press against the block 2, thus tending to keep the blocks 1 and 2 apart, leaving a slight space 9 between them. Upon the opposing faces of the said blocks are spread layers of some suitable fabric 8, which is preferably thick cloth, such as canton-flannel or felt. The block 3 is provided with transverse slots 7, within which the coils 5 are retracted when sufficient force is applied to overcome the resiliency of the spring 4 and bring the blocks together, the staples 6 in the block 2 being loosely adjusted to permit the slight movement necessary. The face of the block 2, which is in apposition with the tree-body 1, has a longitudinal groove 10, which has a curve approximating that of the convex surface of the average-sized tree in order to aid in preventing lateral displacement when sudden force is applied to the block 3.

In Fig. 2 is shown a modified form of the block 3, the face of which in apposition with the trunk presents a plane surface. This form has its advantages, one of which is the reduction in the manufacturing cost.

To render my improved insect-destroyer effective, it will be necessary to provide each tree in an orchard with one or more of the devices, which are to be placed at a convenient height above the ground, where they are allowed to remain for an indefinite period. The space 9, left between the blocks and lined with suitable felt or cloth, is of sufficient depth to be dark and affords an ideal nesting-place for the larvæ, which will crawl between the cloth-lined surfaces and prepare to spin their cocoons. When in the judgment of the operator sufficient time has elapsed, he takes a hammer or small mallet and with this strikes each block 3 a smart blow as he walks around the tree-rows, thus bringing the opposing faces of the blocks in contact with sufficient force to crush any insects which may have crawled between them and also to destroy the pupæ, if cocoons have been spun. The retractive force of the springs will restore the blocks to their initial position, and the trap will thus be automatically reset. The operation may be repeated as often as may be necessary to effectually rid a plantation of noxious insects.

It is evident that many changes may be made in the precise form and arrangement of the apparatus without departing from the spirit or scope thereof, and I therefore do not wish to be limited to the precise construction herein set forth; but,

Having thus described my invention, what I claim is—

1. A device for the purpose specified including means for removably attaching said device to a tree, a compartment for sheltering insects, and means for crushing insects which have been decoyed within said compartment.

2. A device for the purpose specified including a plurality of blocks, means for removably securing said blocks to a tree, means for maintaining an interval between the blocks and means for allowing the opposing faces of the blocks to engage when force is applied thereto.

3. A device for the purpose specified including a plurality of blocks, means for removably securing said blocks to a tree-trunk, means for maintaining a slight interval between said blocks, means for permitting the opposing faces of the blocks to engage when force is applied thereto, and means for preventing a lateral deviation of the said blocks when such force is applied.

4. A device for the purpose specified including a plurality of blocks having plane opposed surfaces, a flexible clasp by means of which the said blocks may be removably attached to a tree, a spring for keeping the blocks apart, and a suitable covering for said plane surfaces.

5. A device for the purpose specified including a plurality of blocks having plane opposed surfaces, a flexible clasp by means of which said blocks may be removably attached to a tree, a spring for keeping the blocks apart, a suitable covering for the said plane opposing surfaces, a transverse groove in one of said blocks within which the said spring may be retracted when pressure is applied to the blocks, and a longitudinal groove in that face of one of the blocks which is in contact with the tree-bark.

In testimony whereof I affix my signature in presence of two witnesses.

ALONZO S. BEAN.

Witnesses:
ARTHUR MEYER,
LOUIS WACHTER.